US011500537B2

(12) United States Patent
Hong et al.

(10) Patent No.: US 11,500,537 B2
(45) Date of Patent: Nov. 15, 2022

(54) ELECTRONIC DEVICE AND CONTROLLING METHOD THEREFOR

(71) Applicant: Samsung Electronics Co., Ltd., Suwon-si (KR)

(72) Inventors: Joohwan Hong, Suwon-si (KR); Sangjun Bae, Suwon-si (KR); Kyuho Jo, Suwon-si (KR); Munkeun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/296,712

(22) PCT Filed: Dec. 27, 2019

(86) PCT No.: PCT/KR2019/018572
§ 371 (c)(1),
(2) Date: May 25, 2021

(87) PCT Pub. No.: WO2020/141809
PCT Pub. Date: Jul. 9, 2020

(65) Prior Publication Data
US 2022/0050590 A1 Feb. 17, 2022

(30) Foreign Application Priority Data
Jan. 3, 2019 (KR) .................. 10-2019-0000651

(51) Int. Cl.
G06F 3/04883 (2022.01)
G06V 20/62 (2022.01)
(Continued)

(52) U.S. Cl.
CPC ........ G06F 3/04883 (2013.01); G06F 3/0482 (2013.01); G06F 3/04817 (2013.01);
(Continued)

(58) Field of Classification Search
CPC ............. G06F 3/04883; G06F 3/04817; G06F 3/0482; G06F 3/04845; G06F 2203/04808;
(Continued)

(56) References Cited

U.S. PATENT DOCUMENTS 6,393,848 B2    5/2002 Roh et al.
9,007,345 B2    4/2015 Han et al.
(Continued)

FOREIGN PATENT DOCUMENTS

EP    3 076 281 A1    10/2016
JP    3106792 U       1/2005
(Continued)

OTHER PUBLICATIONS

Partial European Search Report dated Dec. 23, 2021, issued in European Patent Application No. 19907662.1.

Primary Examiner — Premal R Patel
(74) Attorney, Agent, or Firm — Jefferson IP Law, LLP

(57) ABSTRACT

Disclosed is an electronic device. An electronic device comprises: a display provided at a front surface of the electronic device; a storage; a communication interface including a circuit; and a processor for providing a board screen on the display, identifying a display size of an image on the basis of resolution information of the image when the image is received through the communication interface, adding the image onto the board screen on the basis of the identified display size, adjusting at least one of a display location or a display size of the image to correspond to a first touch input when the first touch input with respect to the image is detected, and adding a drawing object corresponding to a second touch input onto the board screen when the second touch input with respect to the board screen is detected.

18 Claims, 12 Drawing Sheets

(51) Int. Cl.
*G06F 3/04817* (2022.01)
*G06F 3/0482* (2013.01)
*G06F 3/04845* (2022.01)
*G09G 5/373* (2006.01)
*G06V 30/10* (2022.01)

(52) U.S. Cl.
CPC .......... *G06F 3/04845* (2013.01); *G06V 20/62* (2022.01); *G09G 5/373* (2013.01); *G06F 2203/04808* (2013.01); *G06V 30/10* (2022.01); *G06V 2201/02* (2022.01); *G09G 2340/04* (2013.01)

(58) Field of Classification Search
CPC ...... G06F 3/147; G06F 3/0488; G06F 3/0484; G06F 3/1454; G06V 20/62; G06V 30/10; G06V 2201/02; G06V 30/226; G09G 5/373; G09G 2340/04; G09G 5/14; G09G 5/377; H04L 12/2803
See application file for complete search history.

(56) References Cited

U.S. PATENT DOCUMENTS

| | | | |
|---|---|---|---|
| 10,296,203 B2 | 5/2019 | Jung et al. | |
| 2005/0248778 A1 | 11/2005 | Kim | |
| 2008/0074444 A1* | 3/2008 | Morikawa | G09G 5/005 345/660 |
| 2014/0164984 A1* | 6/2014 | Farouki | G06F 3/0485 715/784 |
| 2014/0184531 A1 | 7/2014 | Demiya | |
| 2016/0070450 A1* | 3/2016 | Irimoto | G06T 11/60 345/634 |
| 2017/0124740 A1* | 5/2017 | Campbell | G06F 40/18 |
| 2017/0186079 A1* | 6/2017 | Kim | G06Q 30/0633 |
| 2017/0255304 A1 | 9/2017 | Lee et al. | |
| 2017/0364105 A1* | 12/2017 | Greene | G05D 23/1904 |
| 2018/0046605 A1* | 2/2018 | Hickey | G06F 3/04883 |
| 2018/0187943 A1 | 7/2018 | Woo et al. | |
| 2018/0187969 A1 | 7/2018 | Kim et al. | |
| 2019/0257571 A1 | 8/2019 | Park et al. | |

FOREIGN PATENT DOCUMENTS

| | | |
|---|---|---|
| JP | 2017-133803 A | 8/2017 |
| KR | 10-0601672 B1 | 7/2006 |
| KR | 10-2015-0018985 A | 2/2015 |
| KR | 10-2016-0026342 A | 3/2016 |
| KR | 10-2017-0013738 A | 2/2017 |
| KR | 10-1811636 B1 | 12/2017 |
| KR | 10-2018-0024352 A | 3/2018 |

* cited by examiner

FIG. 6

| Attribute Name | Type |
|---|---|
| object_id | INTEGER |
| parent_id | INTEGER |
| data_source_type | INTEGER |
| data_source_id | TEXT |
| data_source_file | TEXT |
| frame_style | INTEGER |
| x | INTEGER |
| y | INTEGER |
| width | INTEGER |
| height | INTEGER |
| angle | INTEGER |

< INFORMATION ON AN OBJECT >

FIG. 7

| Attribute Name | Type |
|---|---|
| board_id | INTEGER |
| create_time | INTEGER |
| update_time | INTEGER |
| thumbnail_path | TEXT |
| bg_path | TEXT |
| clock_visibility | INTEGER |
| object_id_list | TEXT |

< INFORMATION ON A BOARD SCREEN >

10-1

DATE OF GENERATION     June, 18
DATE OF FINAL STORAGE     July, 5

10-2

DATE OF GENERATION     July, 2
DATE OF FINAL STORAGE     July, 10

10-3

DATE OF GENERATION     July, 10
DATE OF FINAL STORAGE     July, 10

10-4

DATE OF GENERATION     August, 2
DATE OF FINAL STORAGE     August, 10

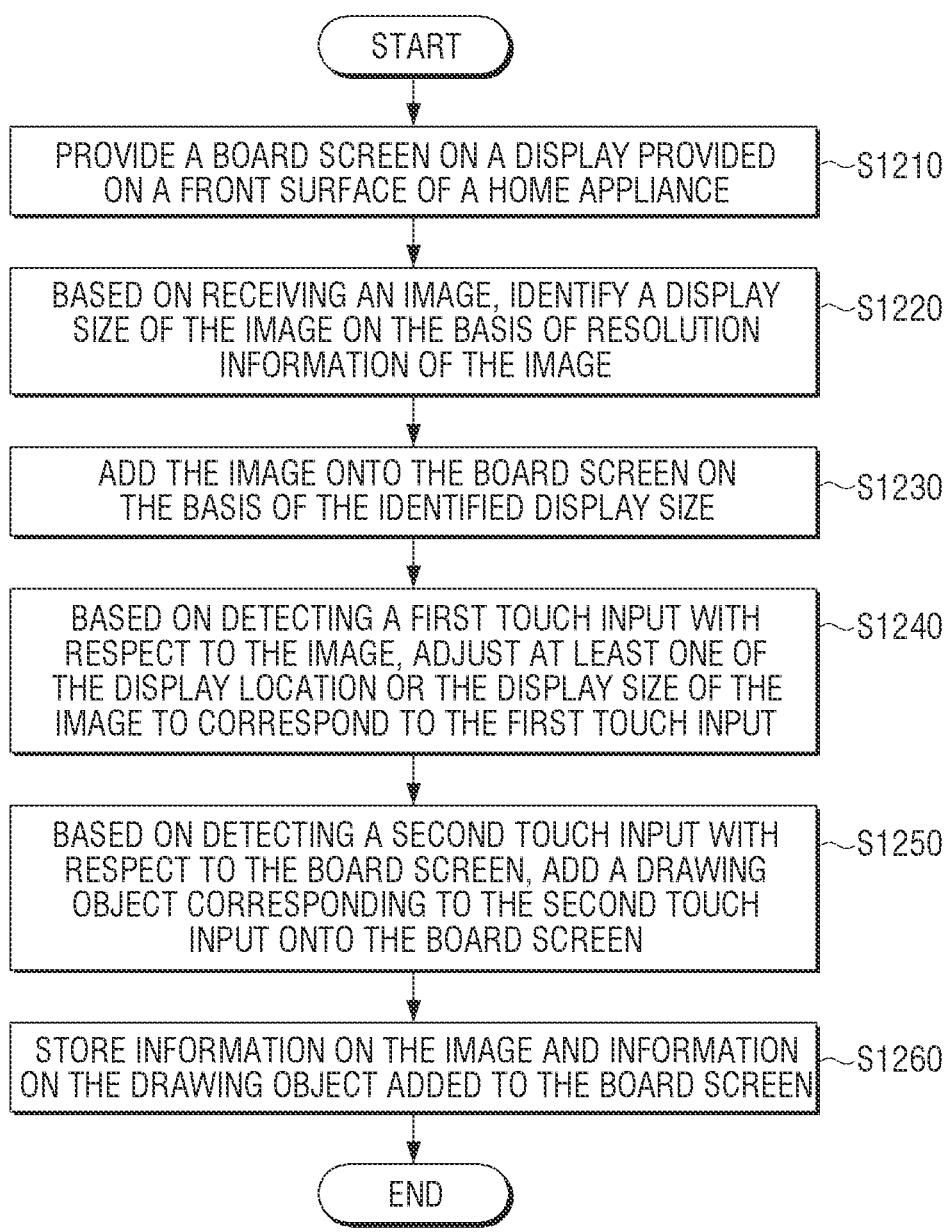

though such transmission and receipt of data is also becoming diverse.
ELECTRONIC DEVICE AND CONTROLLING METHOD THEREFOR

TECHNICAL FIELD

The disclosure relates to a home appliance and a controlling method therefor, and more particularly, to a home appliance including a display, and a controlling method therefor.

DESCRIPTION OF THE RELATED ART

As electronic technologies are being developed, various types of electronic devices are being developed and distributed.

In particular, various home appliances that are recently being distributed to homes can transmit and receive data with one another by being combined with an Internet of Things technology, and utilization of home appliances though such transmission and receipt of data is also becoming diverse.

In the case of a refrigerator, it can be utilized as a hub providing information to family members in addition to its conventional role of a storage of food. For example, a refrigerator may include a display, and provide news, recipes, schedules, etc. to family members.

However, although conventional home appliances provide information through a display combined with an Internet of Things, the home appliances merely provide news, recipes, etc. only within a template of which format is restricted. Also, conventional home appliances have a problem that there are restrictions in terms of the format for a user to freely add images, sketches, etc.

Accordingly, a need for a technology for freely adding and editing schedules, images, things to do lists, etc. through a display included in a home appliance has arisen.

DETAILED DESCRIPTION OF THE INVENTION

Technical Problem

The disclosure is for addressing the aforementioned need, and the purpose of the disclosure is in providing a home appliance that adds images, sketches, drawings, etc. to the home appliance through a board screen, and a controlling method therefor.

Technical Solution

A home appliance according to the disclosure for achieving the aforementioned purpose includes a display provided on the front surface of the home appliance, a storage, a communication interface including a circuit, and a processor configured to provide a board screen on the display, based on receiving an image through the communication interface, identify a display size of the image on the basis of resolution information of the image, and add the image onto the board screen on the basis of the identified display size, based on detecting a first touch input with respect to the image, adjust at least one of a display location or a display size of the image to correspond to the first touch input, and based on detecting a second touch input with respect to the board screen, add a drawing object corresponding to the second touch input onto the board screen, wherein the processor stores information on the image and information on the drawing object added to the board screen in the storage.

Here, the information on the image may include at least one of a file path of the image, a file type of the image, coordinate information of the image added onto the board screen, or size information of the image, and the information on the drawing object may include at least one of shape information of the drawing object or coordinate information of the drawing added onto the board screen.

Also, the processor may, according to an event wherein a predetermined cycle comes or an event wherein a storage menu is selected, capture the board screen and acquire a capture image of the board screen, and control the communication interface to transmit the capture image, the information on the image, and the information on the drawing object to a server.

In addition, the processor may, based on receiving a command for providing a new board screen, store information on the board screen provided on the display in the storage, and then provide the new board screen through the display, and the information on the board screen may include at least one of the capture image with respect to the board screen, the information on the image, or the information on the drawing object.

Here, the processor may, based on the number of board screens stored in the storage exceeding a threshold number, transmit the information on the board screen stored in the storage to the server through the communication interface.

Also, the processor may provide an icon for executing any one of a plurality of applications included in the storage onto the board screen, and based on a user command selecting the icon being input, control the display to display an execution screen of an application corresponding to the selected icon in one area on the board screen.

In addition, the storage may store user identification information and user device information corresponding to a plurality of respective users, and the processor may recognize a text corresponding to the drawing object, identify at least one user among the plurality of users on the basis of the text and the stored user identification information, and transmit information related to the drawing object through the communication interface on the basis of the user device information corresponding to the identified user.

Further, the processor may recognize a text corresponding to the drawing object, and change the drawing object to a text object of a predetermined font on the basis of the recognized text.

Also, the processor may, based on receiving a command for loading information on a board screen stored in the storage, control the display to display a capture image corresponding to the stored board screen, and a list including information on the time point of generation and the time point of storage of the stored board screen.

In addition, the home appliance may include a sensor, and the processor may, based on detecting a user through the sensor in a standby mode wherein the display is turned off, control the display to display the board screen before the display was turned off on the basis of the information on the stored board screen.

Meanwhile, a controlling method for a home appliance according to an embodiment of the disclosure includes the steps of providing a board screen on a display provided on the front surface of the home appliance, based on receiving an image, identifying a display size of the image on the basis of resolution information of the image, adding the image onto the board screen on the basis of the identified display size, based on detecting a first touch input with respect to the image, adjusting at least one of a display location or a display size of the image to correspond to the first touch input, based on detecting a second touch input with respect to the board screen, adding a drawing object corresponding to the second touch input onto the board screen, and storing information on the image and information on the drawing object added to the board screen.

Here, the information on the image may include at least one of a file path of the image, a file type of the image, coordinate information of the image added onto the board screen, or size information of the image, and the information on the drawing object may include at least one of shape information of the drawing object or coordinate information of the drawing added onto the board screen.

Also, the controlling method may include the step of, according to an event wherein a predetermined cycle comes or an event wherein a storage menu is selected, capturing the board screen and acquiring a capture image of the board screen, and transmitting the capture image, the information on the image, and the information on the drawing object to a server.

In addition, the controlling method may include the step of, based on receiving a command for providing a new board screen, storing information on the board screen provided on the display, and then providing the new board screen through the display. Here, the information on the board screen may include at least one of the capture image with respect to the board screen, the information on the image, or the information on the drawing object.

Further, the controlling method may include the step of, based on the number of board screens stored in the home appliance exceeding a threshold number, transmitting the information on the board screen stored in the home appliance to the server.

Also, the controlling method may include the steps of providing an icon for executing any one of a plurality of applications onto the board screen, and based on a user command selecting the icon being input, displaying an execution screen of an application corresponding to the selected icon in one area on the board screen.

Meanwhile, the home appliance may store user identification information and user device information corresponding to a plurality of respective users, and the controlling method according to an embodiment of the disclosure may include the steps of recognizing a text corresponding to the drawing object, identifying at least one user among the plurality of users on the basis of the text and the stored user identification information, and transmitting information related to the drawing object on the basis of the user device information corresponding to the identified user.

Also, the controlling method may include the steps of recognizing a text corresponding to the drawing object, and changing the drawing object to a text object of a predetermined font on the basis of the recognized text.

In addition, the controlling method may include the step of, based on receiving a command for loading information on a board screen stored in the home appliance, displaying a capture image corresponding to the stored board screen, and a list including information on the time point of generation and the time point of storage of the stored board screen.

Further, the controlling method may include the step of, based on detecting a user through the sensor provided in the home appliance in a standby mode wherein the display is turned off, displaying the board screen before the display was turned off on the basis of the information on the stored board screen.

Effect of the Invention

According to the various embodiments of the disclosure as described above, images, sketches, etc. are not added within a template where there are restrictions in terms of the format, but a user can freely add various types of objects on a display.

BRIEF DESCRIPTION OF DRAWINGS

FIG. 6 is a diagram for illustrating information on an object according to an embodiment of the disclosure;

FIG. 7 is a diagram for illustrating information on a board screen according to an embodiment of the disclosure;

FIG. 12 is a flow chart for illustrating a controlling method of a home appliance according to an embodiment of the disclosure.

BEST MODE FOR IMPLEMENTING THE INVENTION

Mode for Implementing the Invention

Figure 1:
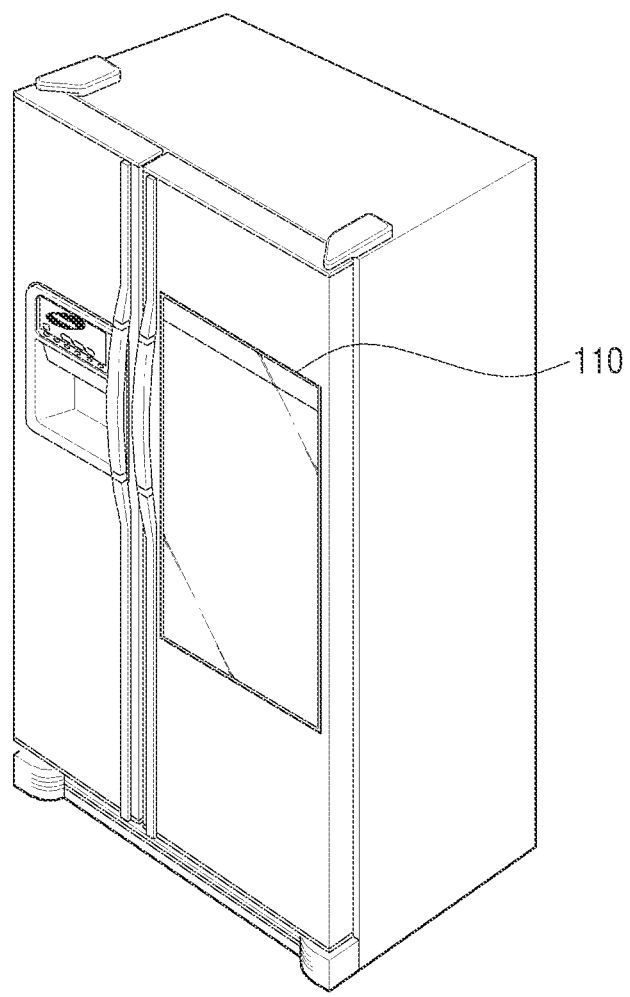
FIG. 1 is a diagram illustrating an exterior of a home appliance according to an embodiment of the disclosure.

Hereinafter, the disclosure will be described in detail with reference to the accompanying drawings.

As terms used in the embodiments of the disclosure, general terms that are currently used widely were selected as far as possible, in consideration of the functions described in the disclosure. However, the terms may vary depending on the intention of those skilled in the art who work in the pertinent field, previous court decisions, or emergence of new technologies. Also, in particular cases, there are terms that were designated by the applicant on his own, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

In this specification, expressions such as "have," "may have," "include," and "may include" should be construed as denoting that there are such characteristics (e.g.: elements such as numerical values, functions, operations, and components), and the expressions are not intended to exclude the existence of additional characteristics.

Also, the expression "at least one of A and/or B" should be interpreted to mean any one of "A" or "B" or "A and B."

In addition, the expressions "first," "second," and the like used in this specification may be used to describe various elements regardless of any order and/or degree of importance. Also, such expressions are used only to distinguish one element from another element, and are not intended to limit the elements.

Meanwhile, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

Also, singular expressions include plural expressions, unless defined obviously differently in the context. Further, in the disclosure, terms such as "include" and "consist of" should be construed as designating that there are such characteristics, numbers, steps, operations, elements, components or a combination thereof described in the specification, but not as excluding in advance the existence or possibility of adding one or more of other characteristics, numbers, steps, operations, elements, components or a combination thereof.

In addition, in the disclosure, "a module" or "a part" performs at least one function or operation, and may be implemented as hardware or software, or as a combination of hardware and software. Further, a plurality of "modules" or "parts" may be integrated into at least one module and implemented as at least one processor (not shown), except "modules" or "parts" which need to be implemented as specific hardware.

Meanwhile, in this specification, the term "user" may refer to a person who uses an electronic device or a device using an electronic device (e.g.: an artificial intelligence electronic device).

Hereinafter, an embodiment of the disclosure will be described in more detail with reference to the accompanying drawings.

FIG. 1 is a diagram illustrating an exterior of a home appliance 100 according to an embodiment of the disclosure.

The home appliance 100 according to the various embodiments of this specification may include, for example, a smartphone, a tablet PC, a mobile phone, a video phone, an e-book reader, a desktop PC, a laptop PC, a netbook computer, a workstation, a server, a PDA, a portable multimedia player (PMP), an MP3 player, a medical instrument, a camera, or a wearable device. Here, a wearable device may include at least one of an accessory-type device (e.g.: a watch, a ring, a bracelet, an ankle bracelet, a necklace, glasses, a contact lens, or a head-mounted-device (HMD)), a device integrated with fabrics or clothing (e.g.: electronic clothing), a body-attached device (e.g.: a skin pad or a tattoo), or an implantable circuit. Also, in some embodiments, the home appliance 100 may include at least one of, for example, a television, a digital video disk (DVD) player, an audio, a refrigerator, an air conditioner, a cleaner, an oven, a microwave oven, a washing machine, an air cleaner, a set top box, a home automation control panel, a security control panel, a media box (e.g.: Samsung HomeSync™, Apple TV™, or Google TV™), a game console (e.g., Xbox™ PlayStation™), an electronic dictionary, an electronic key, a camcorder, or an electronic photo frame.

Hereinafter, explanation will be made by limiting the home appliance 100 to a refrigerator for the convenience of explanation, but this is merely an embodiment, and the disclosure is obviously not limited thereto. Also, it is obvious that the home appliance 100 according to an embodiment of the disclosure can be implemented as home appliances 100 in various forms that can provide a screen through a display 110.

Referring to FIG. 1, the home appliance 100 may include a main body of which front surface is opened, a storage which is formed inside the main body and where food is refrigerated and/or kept, and a door opening and closing the opened front surface of the main body.

Here, the main body may form the exterior of the home appliance 100. The main body may include an inner cabinet forming a storage, and an outer cabinet coupled with the inner cabinet and forming the exterior of the main body.

The storage may be partitioned into a plurality of storages by a horizontal partition and a vertical partition. As an example, the storage may be partitioned into an upper storage and a lower storage, and in the storages, a shelf, an airtight container, etc. may be provided.

The storages may be opened and closed by doors. For example, an area of the upper storage may be opened and closed by an upper first door, and the remaining areas of the upper storage may be opened and closed by an upper second door. Also, an area of the lower storage may be opened and closed by a lower first door, and the remaining areas may be opened and closed by a lower second door.

The doors may include handles so that the doors can be opened and closed easily. As an example, a handle may be formed lengthily in an up-to-down direction between the upper first door and the upper second door, and a handle may be formed lengthily in an up-to-down direction between the lower first door and the lower second door.

In particular, the home appliance 100 according to an embodiment of the disclosure may include a display 110 provided on the front surface. Referring to FIG. 1, the display 110 may be provided in one area of the front surface of the door. The home appliance 100 according to an embodiment of the disclosure may provide various screens through the display 110. Hereinafter, various screens provided through the display 110 will be described.

Figure 2:
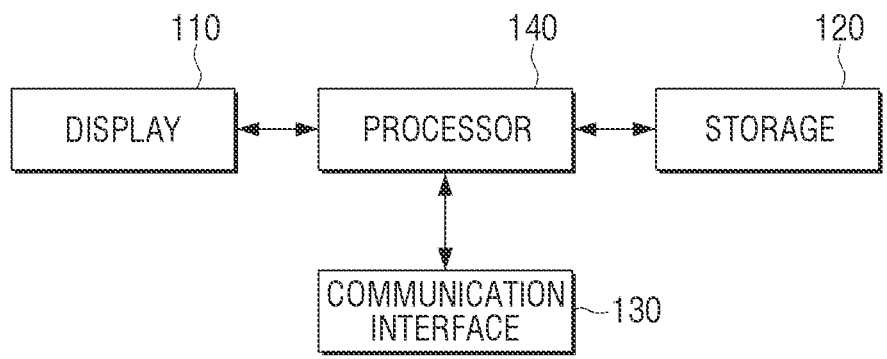
FIG. 2 is a block diagram illustrating a configuration of a home appliance according to an embodiment of the disclosure.

FIG. 2 is a block diagram illustrating a configuration of a home appliance according to an embodiment of the disclosure.

Referring to FIG. 2, the home appliance 100 includes a display 110, a storage 120, a communication interface 130, and a processor 140.

The display 110 may be implemented as displays in various forms such as a Liquid Crystal Display (LCD), an Organic Light Emitting Diodes (OLED) Display, a Plasma Display Panel (PDP), etc. In the display 110, driving circuits that may be implemented in forms such as an a-si TFT, a low temperature poly silicon (LTPS) TFT, an organic TFT (OTFT), etc., and a backlight unit and the like may also be included together. Meanwhile, the display 110 may also be implemented as a touch screen combined with a touch sensor, a flexible display, a 3D display, etc.

Also, the display 110 according to an embodiment of the disclosure may include not only a display panel outputting images, but also a bezel housing the display panel. In particular, a bezel according to an embodiment of the disclosure may include a touch sensor for detecting user interactions. Hereinafter, explanation will be made based on the assumption that the display 110 is implemented as a touch screen display, for the convenience of explanation.

The display 110 according to an embodiment of the disclosure may receive a user's touch input, and transmit an electronic signal corresponding to the received touch input to the processor 140. For example, the display 110 may detect a user's touch for the display 110 from a change of an electronic resistance value or a change of electrostatic capacity, and transmit an electronic signal corresponding to the coordinate of the touching point to the processor 140. Then, the processor 140 may identify the coordinate of the user's touching point based on the received electronic signal. Meanwhile, this is merely an embodiment, and the display 110 can obviously be implemented as a touch screen display including touch panels in various forms that can detect a user's touch.

The display 110 according to an embodiment of the disclosure may be installed on a door for user convenience. For example, the display 110 may be provided on any one of the upper first or second door for opening and closing the upper storage. Meanwhile, this is merely an embodiment, and the disclosure is not limited thereto. For example, the display 110 can obviously be provided on any one of the lower first or second door.

The storage 120 stores various data such as an operating system (O/S) software module for operating the home appliance 100, various kinds of multimedia contents, etc. In particular, the storage 120 may store information on a board screen, and an image, a drawing object, etc. added to the board screen. Detailed explanation regarding a board screen will be made later.

The communication interface 130 including a circuit is a component that performs communication with various types of external devices according to various types of communication methods. In particular, the communication interface 130 may perform communication with a user terminal device, a server, etc., and transmit and receive various data such as images, texts, etc.

The processor 140 controls the overall operations of the home appliance 100.

According to an embodiment of the disclosure, the processor 140 may be implemented as a digital signal processor (DSP), a microprocessor, and a time controller (TCON). However, the disclosure is not limited thereto, and the processor 140 may include one or more of a central processing unit (CPU), a micro controller unit (MCU), a micro processing unit (MPU), a controller, an application processor (AP), a graphics-processing unit (GPU) or a communication processor (CP), and an ARM processor, or may be defined by the terms. Also, the processor 140 may be implemented as a system on chip (SoC) having a processing algorithm stored therein or large scale integration (LSI), or in the form of a field programmable gate array (FPGA). The processor 140 may perform various functions by executing computer executable instructions stored in the storage 120. The processor 140 accesses the storage 120, and performs booting by using the O/S stored in the storage 120. Then, the processor 140 performs various operations by using various kinds of programs, content data, etc. stored in the storage 120.

In particular, the processor 140 may provide a board screen through the display 110. Here, a board screen means a screen that can add various still images, moving images, memos, drawings (or, sketches), or applications, etc. without restrictions on formats and locations. For example, in the past, a screen could add contents such as a memo, a drawing, and an image, etc. only to a predetermined area based on a specific template, but a board screen means a screen that can freely add various contents without restrictions on locations such as a white board.

Here, a board screen may also be referred to as a family board, a display screen, a home screen, etc., but hereinafter, it will be generally referred to as a board screen for the convenience of explanation.

If an image is received through the communication interface 130, the processor 140 according to an embodiment of the disclosure may identify the display size of the image on the basis of resolution information of the image, and add the image onto the board screen on the basis of the identified size. Detailed explanation in this regard will be made with reference to FIG. 4.

Figure 4:
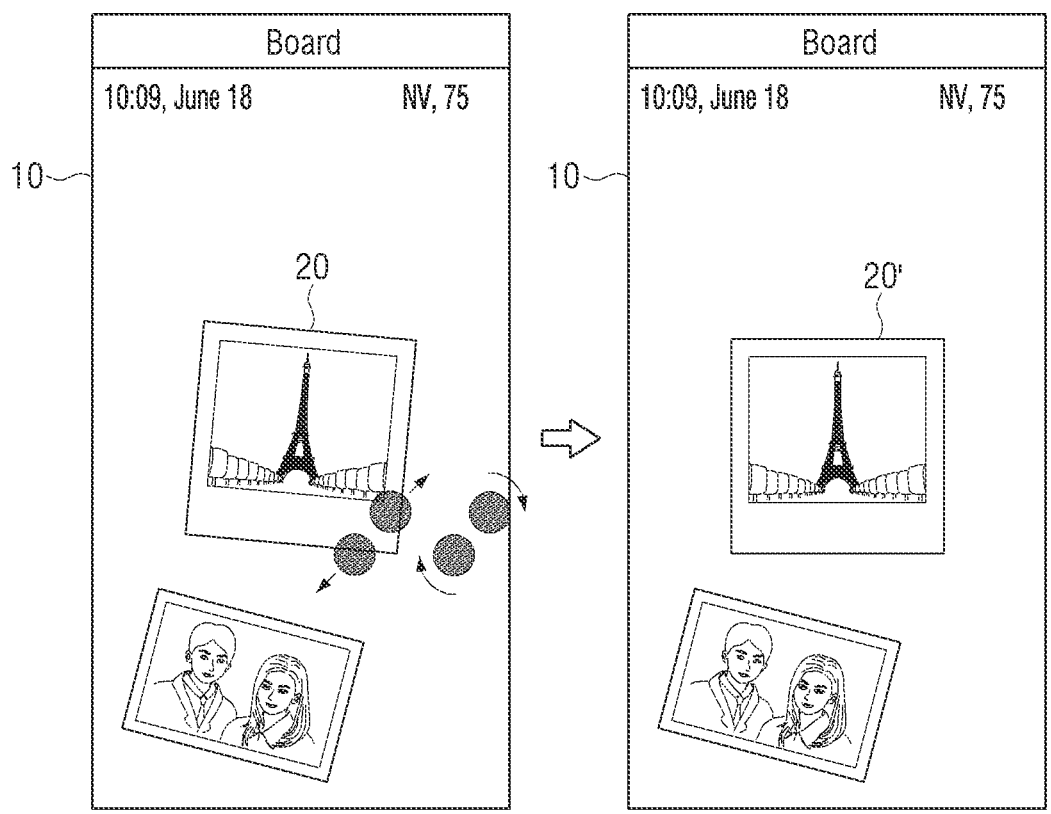
FIG. 4 is a diagram for illustrating a board screen and an image according to an embodiment of the disclosure.

FIG. 4 is a diagram for illustrating a board screen and an image according to an embodiment of the disclosure.

Referring to FIG. 4, a board screen 10 according to an embodiment of the disclosure may provide only minimum objects before an image 20 is added. For example, the processor 140 may provide the current time, location, and temperature, etc. through the board screen 10. Then, if an image 20 is received, the processor 140 may add the image 20 onto the board screen 10. Here, the processor 140 may set the display size of the image 20 on the basis of resolution information of the received image 20. For example, if the resolution of the image 20 is 4K (3840×2160), the processor 140 may change the size of the image 20 to a predetermined first size and add the image 20 onto the board screen 10. As another example, if the resolution of the image 20 is FHD (1920×1080), the processor 140 may change the size of the image 20 to a predetermined second size and add the image 20 onto the board screen 10. Here, the predetermined first size may be relatively bigger than the predetermined second size.

The processor 140 according to an embodiment of the disclosure may add the received image 20 to any location on the board screen 10. As another example, the processor 140 may add the received image 20 to a predetermined location on the board screen 10. Meanwhile, as it will be described below, the processor 140 can obviously adjust the location or the size of the image 20 on the board screen 10 variously according to a touch input for the image 20.

Referring to FIG. 4, if a first touch input for the image 20 is detected, the processor 140 may adjust at least one of the location or the size of the image 20 to correspond to the first touch input. For example, if the first touch input is a pinch, the processor 140 may enlarge the size of the image 20 to correspond to a pinch input. As another example, if the first touch input is a spread, the processor 140 may reduce the size of the image 20 to correspond to a spread input. Also, if the first touch input is a drag, the processor 140 may adjust the location of the image 20 to correspond to a drag input. Here, a pinch may mean a touch input wherein two fingers of a user get close to each other, and a spread may mean a touch input wherein two fingers of a user are distanced from each other.

Then, the processor 140 may display an image 20' wherein at least one of the location or the size was adjusted according to the first touch input through the board screen 10.

Meanwhile, the processor 140 according to an embodiment of the disclosure may limit the number of images 20 added onto the board screen 10. For example, if a plurality of images exceeding a predetermined number are added to the board screen 10, the processor 140 may provide an alarm, or a notification. Meanwhile, this is merely an embodiment, and the processor 140 can obviously add a plurality of images to the board screen 10 without a limitation on the number.

Returning to FIG. 2, if a second touch input for the board screen 10 is detected, the processor 140 according to an embodiment of the disclosure may add a drawing object corresponding to the second touch input onto the board screen 10. Detailed explanation in this regard will be made with reference to FIG. 5.

Figure 5:
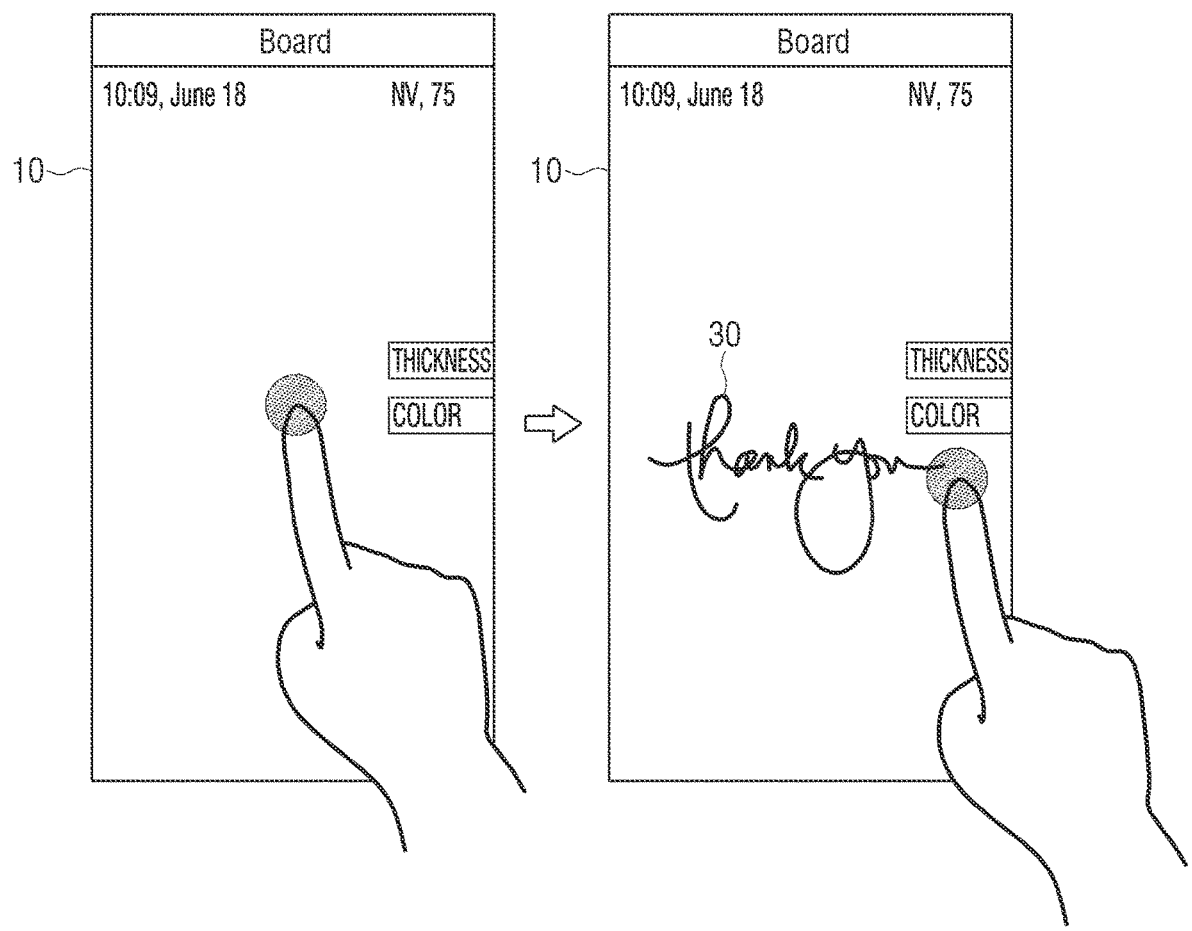
FIG. 5 is a diagram for illustrating a drawing object according to an embodiment of the disclosure.

FIG. 5 is a diagram for illustrating a drawing object according to an embodiment of the disclosure.

Referring to FIG. 5, if the second touch input is a drag, the processor 140 may generate a drawing object 30 so as to correspond to a drag input in a predetermined thickness and a predetermined color. Here, a drag may mean a touch input wherein a user's finger continuously moves without disconnection. The processor 140 according to an embodiment of the disclosure may display a UI for changing the predetermined thickness and the predetermined color in one area on the board screen 10. A touch can obviously be performed through a touch pen, etc. other than a user's finger. Meanwhile, the second touch input may be touch inputs in various forms such as a pan, a swipe, a flick, etc. other than a drag, and the processor 140 may generate a drawing object 30 corresponding to such touch inputs in various forms.

Returning to FIG. 2, the processor 140 according to an embodiment of the disclosure may store information on the image 20 and information on the drawing object 30 added to the board screen 10 in the storage 120. The information on the image 20 and the information on the drawing object 30 will be described in detail with reference to FIG. 6.

FIG. 6 is a diagram for illustrating information on an object according to an embodiment of the disclosure.

Referring to FIG. 6, the processor 140 may include at least one of the identification number (object_id) of the image 20, the file path (data_source_id, data_source_file), the coordinate information (x, y) of the image 20 added onto the board screen 10, or the size information (width, height, angle) of the image 20 as the information on the image 20 added to the board screen 10.

Here, the image 20 may be an image 20 received from an external electronic device (not shown) performing communication with the home appliance 100. For example, if the home appliance 100 is implemented as a refrigerator, the refrigerator may register user terminal devices of the individual family members of the home wherein the refrigerator is placed. Then, the refrigerator may add images (still images, moving images, etc.) received from the registered user devices to the board screen 10.

The processor 140 according to an embodiment of the disclosure may include at least one of the identification number (object_id) of the drawing object 30, the shape information (frame_style) of the drawing object 30, the coordinate information (x, y) of the drawing object 30, or the size information (width, height, angle) of the drawing object 30 as the information on the drawing object 30 added to the board screen 10.

Meanwhile, the information on the object illustrated in FIG. 6 is not limited to the information on the image 20 and the drawing object 30. For example, the storage 120 can obviously store information on objects, memos, applications, texts, etc. in various forms that can be added to the board screen 10.

Returning to FIG. 2, if a command for providing a new board screen is received, the processor 140 according to an embodiment of the disclosure may store information on the board screen 10 provided on the display 110 in the storage 120, and then provide a new board screen through the display 110. Here, the information on the board screen 10 may include at least one of a capture image with respect to the board screen 10, the information on the image 20, or the information on the drawing object 30 added to the board screen 10. Detailed explanation in this regard will be made with reference to FIG. 7.

FIG. 7 is a diagram for illustrating information on a board screen according to an embodiment of the disclosure.

Referring to FIG. 7, the information on the board screen 10 may include at least one of the identification number (board_id) of the board screen 10, the time point of generation (create_time) of the board screen 10, the time point of storage or the time point of final update (update_time) of the board screen 10, a capture image (thumbnail_path) with respect to the board screen 10, or information on an object (object_id_list) added to the board screen 10. Here, the capture image may mean a thumbnail image that captured the board screen 10. The processor 140 according to an embodiment of the disclosure may transmit the capture image of the board screen 10 to external electronic devices through the communication interface 130. Here, the external electronic devices may mean user terminal devices of the family members of the home wherein the home appliance 100 is placed.

A command for providing a new board screen 10' may be a command for storing the board screen 10 that is being displayed through the display 110 in the storage 120, and generating a new board screen 10'. When the command is received, the processor 140 may store the board screen 10 that is currently being provided through the display 110 and the information on the board screen 10 in the storage 120, and provide the new board screen 10' through the display 110. Here, the new board screen 10' may mean a board screen wherein only basic objects (e.g., the current time, weather, etc.) are added, and the image 20, the drawing object 30, a memo, an application, etc. are not added.

Returning to FIG. 2, the processor 140 may provide an icon for executing any one of a plurality of applications included in the storage 120 on the board screen 10. Detailed explanation in this regard will be made with reference to FIG. 8.

Figure 8:
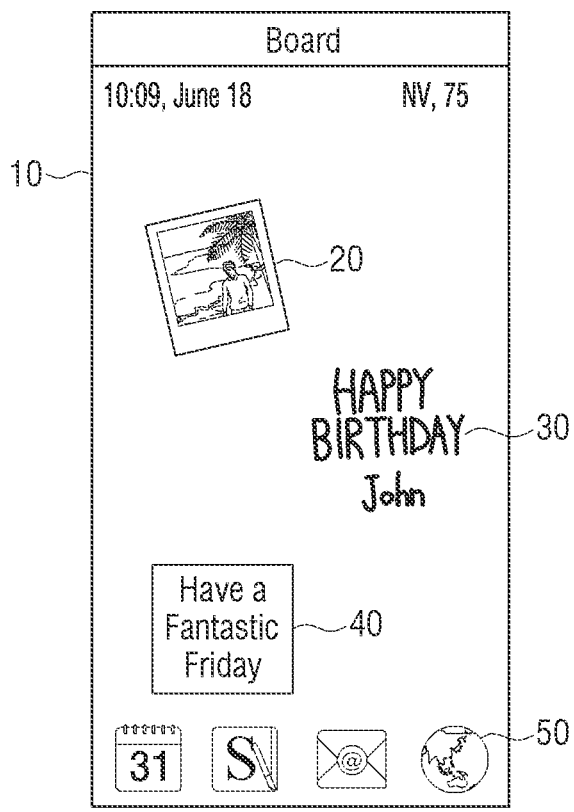
FIG. 8 is a diagram for illustrating an icon according to an embodiment of the disclosure.

FIG. 8 is a diagram for illustrating an icon according to an embodiment of the disclosure.

Referring to FIG. 8, the processor 140 may display an icon 50 for executing an application on the board screen 10. Here, it is obvious that the icon 50 can be located not only in a predetermined area on the board screen 10, but also in all areas on the board screen 10. For example, if a user touch for the icon 50 is input, the processor 140 may move the icon 50 to a location corresponding to the touch. The icon 50 may be located to be overlapped with another object (e.g., the image 20, the drawing object 30, the memo 40, etc.).

If a user command selecting the icon 50 is input, the processor 140 according to an embodiment of the disclosure may display an execution screen of an application corresponding to the selected icon 50 in one area on the board screen 10. For example, if an icon corresponding to a music application is selected, the processor 140 may display the music application in one area on the board screen 10 and execute the application. The processor 140 may provide the application execution screen not through a new screen, but through one area on the board screen 10.

If a touch input for an execution screen of an application is received, the processor 140 according to an embodiment of the disclosure may adjust at least one of the location or the size of the execution screen of the application to correspond to the touch input. For example, if the touch input is a pinch or a spread, the processor 140 may enlarge or reduce the execution screen of the application. As another example, if the touch input is a drag, the processor 140 may adjust the location of the execution screen of the application to a location corresponding to the drag.

Returning to FIG. 2, the processor 140 according to an embodiment of the disclosure may capture the board screen 10 according to an event wherein a predetermined cycle comes or an event wherein a storage menu is selected, and acquire a capture image of the board screen 10. Then, the processor 140 may control the communication interface 130 to transmit the capture image, the information on the image 20, and the information on the drawing object 30 to a server. Detailed explanation in this regard will be made with reference to FIG. 9.

Figure 9:
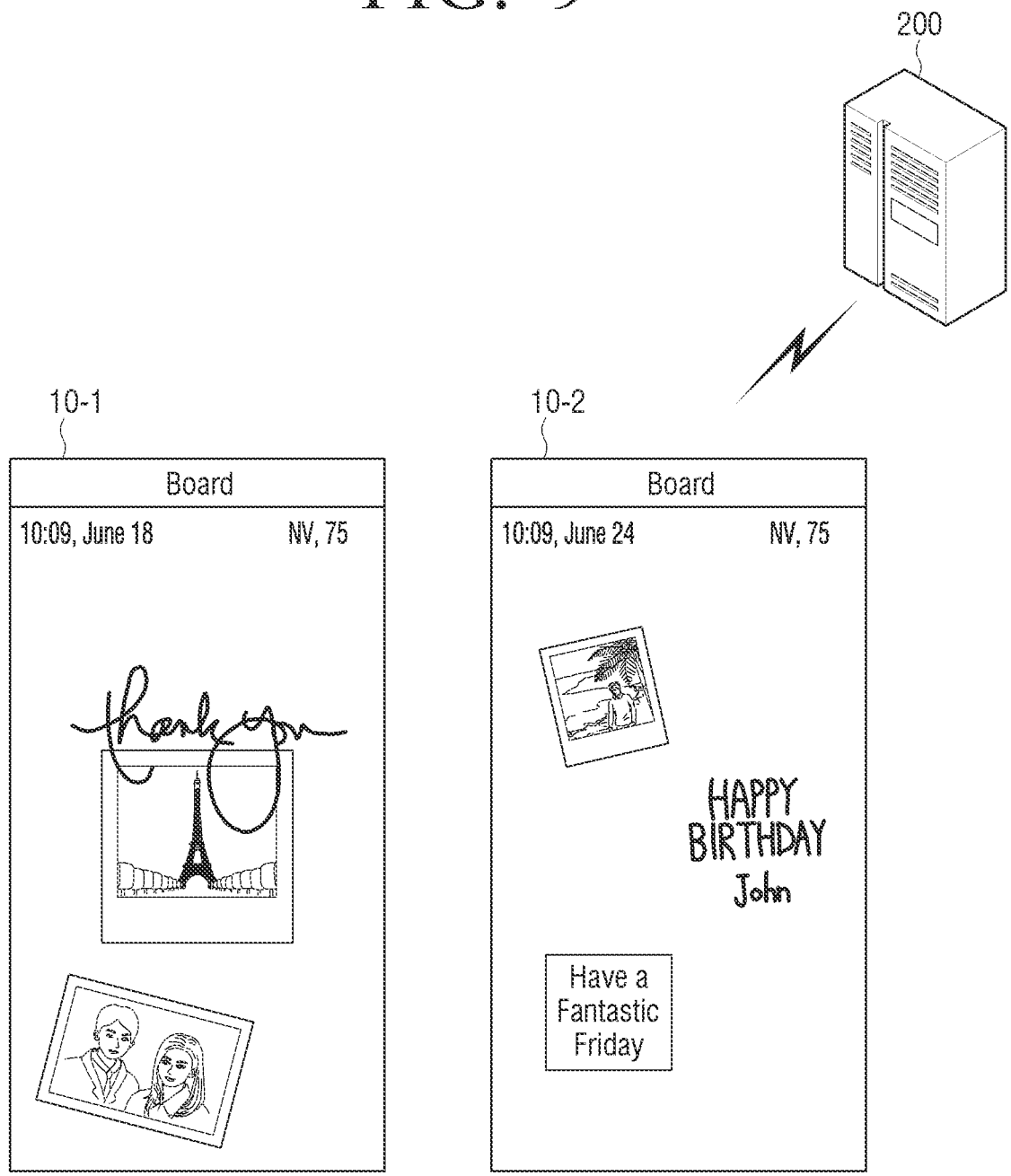
FIG. 9 is a diagram for illustrating a home appliance and a server according to an embodiment of the disclosure.

FIG. 9 is a diagram for illustrating a home appliance and a server according to an embodiment of the disclosure.

Referring to FIG. 9, the processor 140 according to an embodiment of the disclosure may store a plurality of board screens 10-1, 10-2 in the storage 120. As an example, the storage 120 may store information on a first board screen 10-1 that was generated in the past and information on a second board screen 10-2 that is currently being displayed.

If the board screen that is currently being displayed is the second board screen 10-2, the processor 140 may store information on the second board screen 10-2 in the storage 120 according to an event wherein a predetermined cycle comes. Here, it is obvious that the predetermined cycle can be set variously according to the manufacturer's setting or a user's setting such as a cycle of one hour, a cycle of one day, etc. As another example, if an event wherein a storage menu is selected according to a user command occurs, the processor 140 may store information on the second board screen 10-2 that is currently being displayed in the storage 120. Here, the information on the second board screen 10-2 may include a capture image that was acquired by capturing the second board screen 10-2, information on the image 20 added to the second board screen 10-2, and information on the drawing object 30 added to the second board screen 10-2. Meanwhile, this is merely an embodiment, and the disclosure is not limited thereto. For example, it is obvious that both of information on the memo 40 and information on the icon 50 can be included, and the time point of generation, the time point of storage, etc. of the second board screen 10-2 can be included.

Then, the processor 140 may control the communication interface 130 to transmit the information on the board screen 10 to the server 200. For example, the processor 140 may transmit a capture image of the board screen 10, the information on the image 20, and the information on the drawing object 30 added to the board screen 10 to the server 200.

As another example, if the number of the board screens 10 stored in the storage 120 exceeds a threshold number, the processor 140 may control the communication interface 130 to transmit information on the board screens stored in the storage 120 to the server 200. For example, a case wherein the storage 120 can store ten board screens 10-1, 10-2, . . . , 10-10 may be assumed. If the number of a plurality of board screens stored in the storage 120 exceeds ten, the processor 140 may control the communication interface 130 to transmit information on the plurality of respective board screens 10-1, 10-2, . . . , 10-10 to the server 200. Meanwhile, this is merely an embodiment, and the disclosure is not limited thereto. For example, if it is identified that the remaining capacity of the storage 120 is smaller than the threshold capacity, the processor 140 may control the communication interface 130 to transmit the information on the board screens stored in the storage 120 to the server 200.

Returning to FIG. 2, the processor 140 according to an embodiment of the disclosure may recognize a text corresponding to the drawing object 30. Then, the processor 140 may change the drawing object 30 to a text object of a predetermined font on the basis of the recognized text, and add the text object to the board screen 10. Detailed explanation in this regard will be made with reference to FIG. 10.

Figure 10:
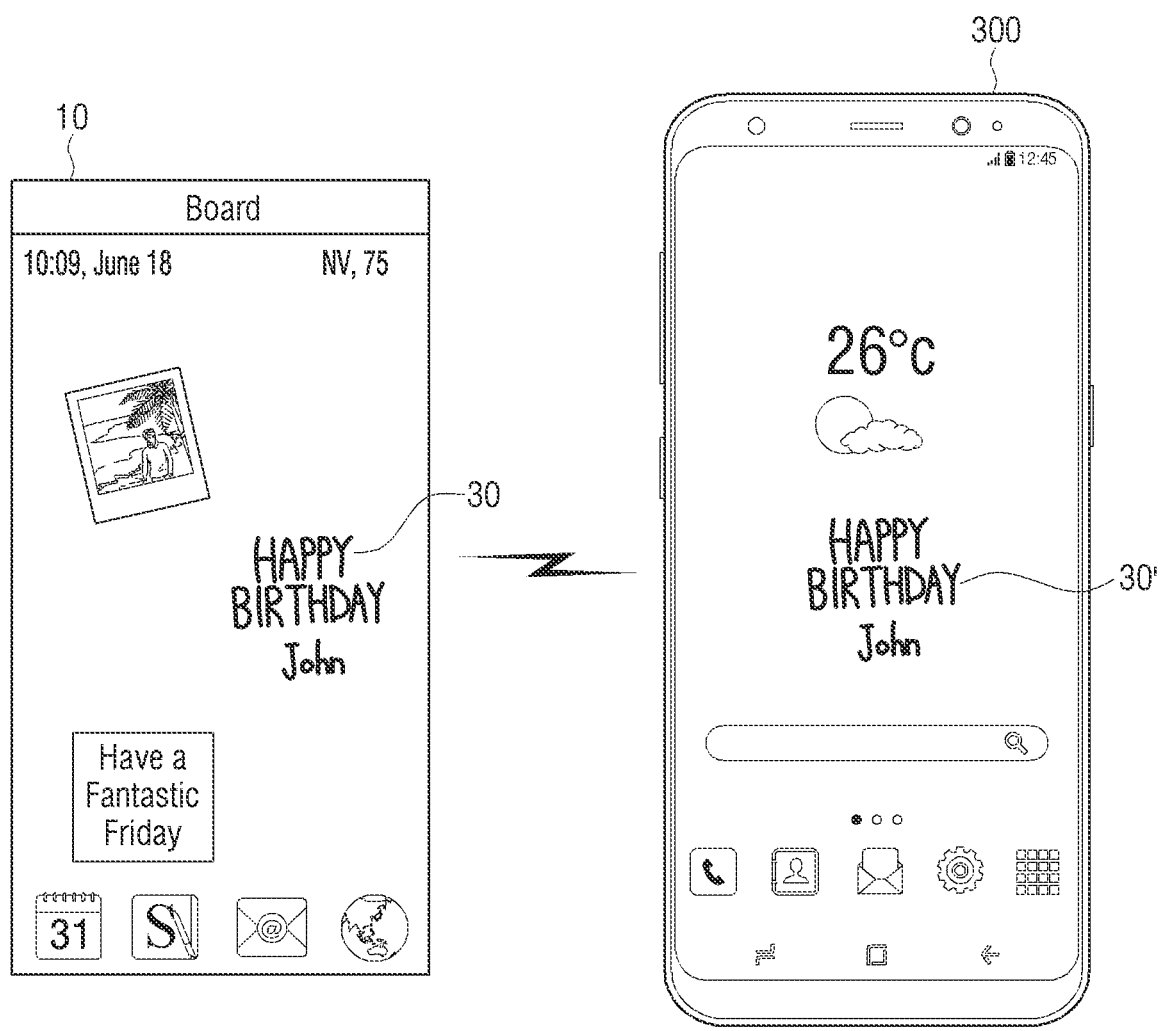
FIG. 10 is a diagram for illustrating a home appliance and a user device according to an embodiment of the disclosure.

FIG. 10 is a diagram for illustrating a home appliance and a user device according to an embodiment of the disclosure.

Referring to FIG. 10, if the second touch input for the board screen 10 is detected, the processor 140 according to an embodiment of the disclosure may add the drawing object 30 corresponding to the second touch input onto the board screen 10. Then, the processor 140 may recognize a text corresponding to the drawing object 30. For example, the processor 140 may recognize a text corresponding to the drawing object 30 added onto the board screen 10 based on various character recognition algorithms. Referring to FIG. 10, the processor 140 may perform Optical Character Recognition (OCR) on the drawing object 30 and recognize the text 'HAPPY BIRTHDAY JOHN.' Here, OCR is an embodiment of character recognition algorithms, and character recognition algorithms are not limited thereto. As another example, the processor 140 can obviously identify a text included in the drawing object 30 based on Tensorflow, various machine learning models, etc.

Then, the processor 140 may acquire a text object of a predetermined font on the basis of the recognized text. The processor 140 may change the drawing object 30 to the acquired text object. Here, it is obvious that the predetermined font can be changed to various fonts according to user setting.

The storage 120 according to an embodiment of the disclosure may store user identification information and user device information corresponding to a plurality of respective users.

As an example, the home appliance 100 may be used by a plurality of users. In case the home appliance 100 is installed in a home, all of the family members may be the users of the home appliance 100. The home appliance 100 according to an embodiment of the disclosure may store identification information corresponding to the plurality of respective users (e.g., the family members).

Here, the identification information may include a user profile, and the name, the title, the nickname, the acronym, etc. for identifying a user. According to an embodiment of the disclosure, the home appliance 100 may register a user on the basis of user identification information. Then, the home appliance 100 may store user device information corresponding to the plurality of respective users. Here, the user device information may include identification information and authentication information required for the home appliance 100 to perform communication with a device corresponding to a specific user.

The processor 140 according to an embodiment of the disclosure may identify a specific user among a plurality of users on the basis of user identification information, and acquire user device information corresponding to the identified user. Then, the processor 140 may perform communication with the device of the specific user on the basis of the acquired user device information.

The processor 140 according to an embodiment of the disclosure may recognize a text corresponding to the drawing object 30, and identify at least one user among a plurality of users on the basis of the recognized text and user identification information. For example, if the recognized text is 'John,' the processor 140 may identify 'John' among a plurality of users on the basis of the user profile included in the user identification information.

Then, the processor 140 may perform communication with the user terminal device 300 of 'John' on the basis of user device information corresponding to 'John.' The processor 140 may transmit the drawing object 30 to the user terminal device 300 corresponding to the identified user. Referring to FIG. 10, the processor 140 may control the communication interface 130 to transmit information related to the drawing object 30 including 'HAPPY BIRTHDAY JOHN' to the user terminal device 300 of 'John.' The user terminal device 300 may display the received drawing object 30'. Meanwhile, this is merely an embodiment, and the processor 140 may recognize a text included in the image 20, the memo 40, the icon 50, etc. other than the drawing object 30, and identify the user and the user's device corresponding to the recognized text. Then, the processor 140 may transmit an object (e.g., the image 20, the memo 40, the icon 50, etc.) to the device of the identified user.

The processor 140 according to an embodiment of the disclosure may delete or edit a user registered at the home appliance 100, or add a new user. For example, in the case of adding a new user, the processor 140 may receive or receive an input of identification information of the new user. Then, the processor 140 may receive device information of the new user and store the information in the storage 120.

Returning to FIG. 2, if a command for loading information on the board screen 10 stored in the storage 120 is received, the processor 140 according to an embodiment of the disclosure may control the display 110 to display a capture image corresponding to the stored board screen 10, and a list including information on the time point of generation and the time point of storage of the board screen 10. Detailed explanation in this regard will be made with reference to FIG. 11.

Figure 11:
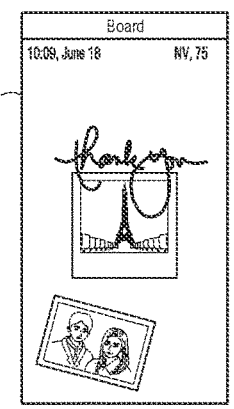
FIG. 11 is a diagram for illustrating a board screen list according to an embodiment of the disclosure.
Figure 11:
Figure 11:
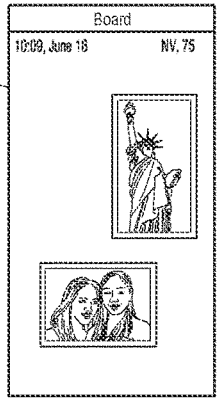
Figure 11:
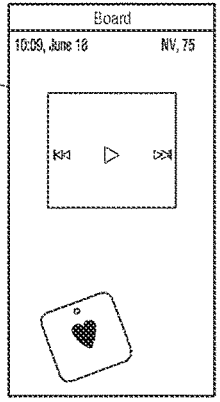

FIG. 11 is a diagram for illustrating a board screen list according to an embodiment of the disclosure.

The storage 120 according to an embodiment of the disclosure may store a plurality of board screens 10-1, 10-2, ..., 10-10. Then, if a command for calling in the board screens 10 stored in the storage 120 is received, the processor 140 may display information on the board screens 10 in the form of a list.

Referring to FIG. 11, the processor 140 may provide information on the first board screen 10-1 to information on the fourth board screen 10-4 in the form of a list. For example, the information on the first board screen 10-1 may include a thumbnail image (or, a capture image) of the first board screen 10-1, the date of generation (or, the time point of generation), and the date of final storage (or, the time point of final update) of the first board screen 10-1.

The processor 140 according to an embodiment of the disclosure may align the list in an ascending order or a descending order based on any one of the time point of generation or the time point of final update of the board screen 10, and display the list.

Figure 3:
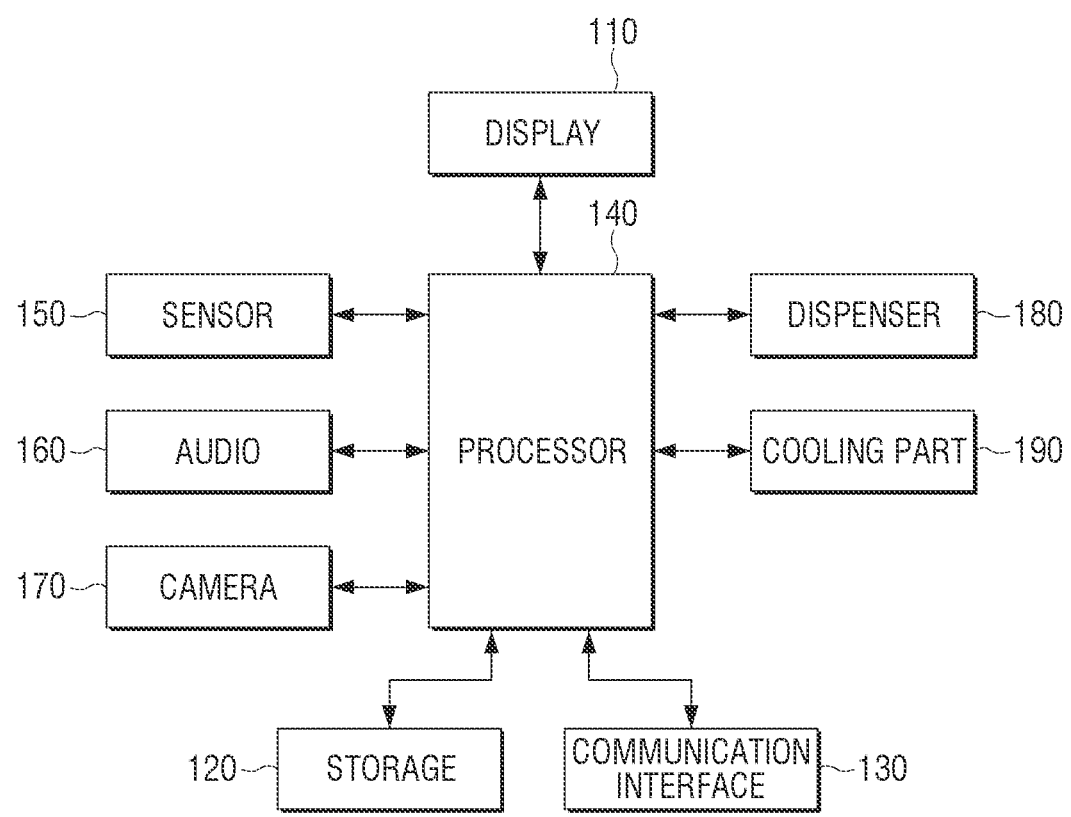
FIG. 3 is a block diagram illustrating a detailed configuration of a home appliance according to an embodiment of the disclosure.

FIG. 3 is a block diagram illustrating a detailed configuration of a home appliance according to an embodiment of the disclosure.

According to FIG. 3, the home appliance 100 includes a display 110, a storage 120, a communication interface 130, a processor 140, a sensor 150, an audio 160, a camera 170, a dispenser 180, and a cooling part 190. Among the components illustrated in FIG. 3, regarding the components overlapping with the components illustrated in FIG. 2, detailed explanation will be omitted.

The display 110 may provide various content screens that can be provided through the home appliance 100. Here, content screens may include various contents such as an image, a moving image, a text, music, etc., application execution screens including various contents, a graphic user interface (GUI) screen, etc.

The display 110 may be implemented in various forms such as a liquid crystal display (LCD), organic light-emitting diodes (OLED), Liquid Crystal on Silicon (LCoS), Digital Light Processing (DLP), micro LEDs, a quantum dot (QD) display panel, etc., but is not limited thereto. Also, it is possible that the display is implemented as a flexible display, a transparent display, etc. depending on cases.

Also, the display 110 according to an embodiment of the disclosure may include not only a display panel outputting images, but also a bezel housing the display panel. In particular, a bezel according to an embodiment of the disclosure may include a touch sensor (not shown) for detecting user interactions.

Meanwhile, the display 110 provided on the home appliance 100 may display various screens generated at the graphic processing part. The home appliance 100 may include the display 110 as a component, but the home appliance 100 can also obviously transmit a signal corresponding to a screen to an external device connected through an interface (not shown), and display various screens through the display of the external device. For example, the display 110 may display a screen of an external device through a mirroring function.

In particular, the display 110 may display the image 20 received from an external electronic device, the drawing object 30, the memo 40, and the icon 50 for executing an application, etc. according to control by the processor 140.

The storage 120 may be implemented as an internal memory such as a ROM (e.g., an electrically erasable programmable read-only memory (EEPROM)), a RAM, etc. included in the processor 140, or as a separate memory from the processor 140. In this case, the storage 120 may be implemented in the form of a memory embedded in the home appliance 100, or in the form of a memory that can be attached to or detached from the home appliance 100 according to the use of stored data. For example, in the case of data for operating the home appliance 100, the data may be stored in a memory embedded in the home appliance 100, and in the case of data for an extension function of the home appliance 100, the data may be stored in a memory that can be attached to or detached from the home appliance 100. Meanwhile, in the case of a memory embedded in the home appliance 100, the memory may be implemented as at least one of a volatile memory (e.g.: a dynamic RAM (DRAM), a static RAM (SRAM), or a synchronous dynamic RAM (SDRAM), etc.) or a non-volatile memory (e.g.: an one time programmable ROM (OTPROM), a programmable ROM (PROM), an erasable and programmable ROM (EPROM), an electrically erasable and programmable ROM (EEPROM), a mask ROM, a flash ROM, a flash memory (e.g.: NAND flash or NOR flash, etc.), a hard drive, or a solid state drive (SSD)). In the case of a memory that can be attached to or detached from the home appliance 100, the memory may be implemented in forms such as a memory card (e.g., compact flash (CF), secure digital (SD), micro secure digital (Micro-SD), mini secure digital (Mini-SD), extreme digital (xD), a multi-media card (MMC), etc.), an external memory that can be connected to a USB port (e.g., a USB memory), etc.

The processor 140 controls the overall operations of the home appliance 100 by using various kinds of programs stored in the storage 120.

Specifically, the processor 140 includes a RAM, a ROM, a main CPU, first to nth interfaces, and a bus.

The RAM, the ROM, the main CPU, and the first to nth interfaces may be connected with one another through the bus.

In the ROM, a set of instructions for system booting, etc. are stored. When a turn-on instruction is input and power is supplied, the main CPU copies the O/S stored in the storage 120 in the RAM according to the instruction stored in the ROM, and boots the system by executing the O/S. When booting is completed, the main CPU copies various kinds of application programs stored in the storage 120 in the RAM, and performs various kinds of operations by executing the application programs copied in the RAM.

The main CPU accesses the storage 120, and performs booting by using the O/S stored in the storage 120. Then, the main CPU performs various operations by using various kinds of programs, content data, etc. stored in the storage 120.

The first to nth interfaces are connected with the aforementioned various kinds of components. One of the interfaces may be a network interface connected with an external device through a network.

Meanwhile, the processor 140 may perform a graphic processing function (a video processing function). For example, the processor 140 may generate a screen including various objects like icons, images, and texts by using an operation part (not shown) and a rendering part (not shown). Here, the operation part (not shown) may operate attribute values such as coordinate values, shapes, sizes, and colors by which respective objects will be displayed according to the layout of the screen based on a received control command. Also, the rendering part (not shown) may generate screens in various layouts including objects, based on the attribute values operated at the operation part (not shown). In addition, the processor 140 may perform various kinds of image processing such as decoding, scaling, noise filtering, frame rate conversion, resolution conversion, etc. for video data.

Meanwhile, the processor 140 may perform processing for audio data. Specifically, the processor 140 may perform various kinds of processing such as decoding or amplification, noise filtering, etc. for audio data.

The communication interface 130 is a component that performs communication with various types of external devices according to various types of communication methods. The communication interface 130 includes a Wi-Fi module, a Bluetooth module, an infrared communication module, and a wireless communication module, etc. Here, respective communication modules may be implemented in the form of at least one hardware chip.

The processor 140 may perform communication with various types of external devices by using the communication interface 130. Here, external devices may include a display device like a TV, an image processing device like a set-top box, an external server, a control device like a remote control, an audio outputting device like a Bluetooth speaker, a lighting device, a home appliance like a smart cleaner and a smart refrigerator, a server like an IoT home manager, etc.

A Wi-Fi module and a Bluetooth module perform communication by using a Wi-Fi method and a Bluetooth method, respectively. In the case of using a Wi-Fi module or a Bluetooth module, various types of connection information such as an SSID and a session key is transmitted and received first, and connection of communication is performed by using the information, and various types of information can be transmitted and received thereafter.

An infrared communication module performs communication according to an infrared Data Association (IrDA) technology of transmitting data to a near field wirelessly by using infrared rays between visible rays and millimeter waves.

A wireless communication module may include at least one communication chip that performs communication according to various wireless communication protocols such as Zigbee, 3rd Generation (3G), 3rd Generation Partnership Project (3GPP), Long Term Evolution (LTE), LTE Advanced (LTE-A), 4th Generation (4G), 5th Generation (5G), etc. other than the aforementioned communication methods.

Other than the above, the communication interface 130 may include at least one of a Local Area Network (LAN) module, an Ethernet module, or a wired communication module that performs communication by using a pair cable, a coaxial cable, or an optical fiber cable, etc.

According to an embodiment of the disclosure, the communication interface 130 may use the same communication module (e.g., a Wi-Fi module) for communicating with an external device like a remote control and an external server.

According to another embodiment of the disclosure, the communication interface 130 may use different communication modules (e.g., a Wi-Fi module) for communicating with an external device like a remote control and an external server. For example, the communication interface 130 may use at least one of an Ethernet module or a Wi-Fi module for communicating with an external server, and use a BT module for communicating with an external device like a remote control. However, this is merely an embodiment, and the communication interface 130 may use at least one communication module among various communication modules in the case of communicating with a plurality of external devices or external servers.

The home appliance 100 according to an embodiment of the disclosure may include a sensor 150. Here, the sensor 150 may detect various signals according to the location wherein the home appliance 100 is arranged, the purpose, etc.

As an example, the home appliance 100 may include an opening and closing detection sensor on the main body or the door, and detect opening and closing of the door through the opening and closing detection sensor. Also, the home appliance 100 may detect the strength when the door is opened or closed. For example, the sensor 150 may detect the degree of shaking of the main body or the door, the size of noise that occurred at the time of opening or closing, and the processor 140 may detect the strength of opening or closing of the door based on the shaking, noise, etc. detected at the sensor 150. Meanwhile, this is merely an embodiment, and the home appliance 100 can obviously detect opening and closing of the door by including various types of sensors 150.

The home appliance 100 according to an embodiment of the disclosure may detect a user through the sensor 150 provided on the front surface. As an example, the sensor 150 may detect an adjacent user within a threshold distance, and the processor 140 may perform an operation corresponding to the detected user.

The home appliance 100 may include a wake up function that is automatically activated when a user approaches within a specific range. For example, if a user approaches within a specific range, the display 110 may be activated. The processor 140 may control the display 110 to display the board screen 10 before the display 110 was turned off on the basis of the information on the board screen 10 stored in the storage 120.

Also, when specific time passes after the user gets out of the specific range, the processor 140 may inactivate the display 110. That is, the display 110 may be in a turn-off state.

As another example, the home appliance 100 may include inner temperature sensors (not shown) that detect the temperature inside the main body. For example, inner temperature sensors may be installed in the plurality of respective storages (e.g., the upper storage, the lower storage, etc.), and detect the temperatures of the plurality of respective storages and transmit electronic signals corresponding to the detected temperatures to the processor 140. Then, the processor 140 may perform operations corresponding to the detected temperatures. As an example, the processor 140 may perform an operation for controlling the inner temperature, an operation of providing the inner temperature through the display 110, etc. Here, the respective inner temperature sensors may include a thermistor of which electronic resistance changes according to the temperature.

The audio 160 may include a speaker that converts an electronic signal received from the processor 140 into an audio signal and outputs the converted audio signal. The processor 140 according to an embodiment of the disclosure may output an audio signal through the audio 160 when a predetermined event occurs. For example, the home appliance 100 may include a briefing mode, and the processor 140 may control the audio 160 to output the current time, the current location, the weather corresponding to the current location, a to-do list application, etc. during a briefing mode operation. As another example, if opening of the door lasts for greater than or equal to a threshold time, the home appliance 100 may control the audio 160 to output a beef sound.

The camera 170 may photograph an image and convert the image into an electronic signal, and transmit the signal to the processor 140.

The camera 170 may include a plurality of optical diodes that convert an optical signal into an electronic signal, and the plurality of optical diodes may be arranged two-dimensionally. The camera 170 may include a Charge-Coupled Device (CCD) image sensor or a Complementary Metal Oxide Semiconductor (CMOS) image sensor wherein the plurality of optical diodes are arranged two-dimensionally.

In particular, the camera 170 may be provided inside the storage and acquire an image of food stored in the storage. Then, the processor 140 may control the display 110 to display the image of the food acquired from the camera 170.

If the home appliance 100 is implemented as a refrigerator according to an embodiment of the disclosure, the refrigerator may include a dispenser 180 and a cooling part 190.

The dispenser 180 may discharge water or ice according to a user input. The home appliance 100 may provide water or ice to the outside without opening or closing of the door through the dispenser 180.

The dispenser 180 may include a dispenser lever that receives a user's discharge command of water or ice, a dispenser nozzle that discharges water or ice, and a dispenser display panel that displays the operation state of the dispenser 180.

The dispenser 180 according to an embodiment of the disclosure may be installed on the outer side of the main body or the door. For example, as illustrated in FIG. 1, the dispenser 180 may be installed on the upper first door. Meanwhile, the disclosure is not limited thereto, and the dispenser 180 can obviously be provided in various ways in one area of the main body or the door.

The cooling part 190 may provide cool air to the storage. The cooling part 190 may maintain the temperature of the storage to within a specific range by using evaporation of a refrigerant.

The cooling part 190 may include a compressor that compresses a refrigerant in a gaseous state, a condenser that converts the refrigerant in a compressed gaseous state into a liquid state, an expander that decompresses the refrigerant in a liquid state, and an evaporator that converts the refrigerant in a decompressed liquid state into a gaseous state.

The cooling part 190 may cool the air inside the storage by using a phenomenon that a refrigerant in a liquid state absorbs heat energy in the surrounding air as the refrigerant is converted into a gaseous state.

However, this is merely an embodiment, and the cooling part 190 is not necessarily limited to include a compressor, a condenser, an expander, and an evaporator. For example, the cooling part 190 may include a Peltier element using a Peltier effect. The Peltier effect refers to a case wherein, if electric currents are made to flow in a contact surface wherein different types of metals contact each other, a heat generation phenomenon occurs in one metal, and a heat absorption phenomenon occurs in the other metal. The cooling part 190 may cool the air inside the storage by using the Peltier element.

As another example, the cooling part 190 may include a magnetic cooling device using a magneto-caloric effect. The magneto-caloric effect refers to a case wherein, if a specific substance (a magneto-caloric substance) is magnetized, heat is emitted, and if a specific substance (a magneto-caloric substance) is demagnetized, heat is absorbed. The cooling part 190 may cool the air inside the storage by using the magnetic cooling device.

The home appliance 100 according to an embodiment of the disclosure may include a user interface and an input/output interface.

The user interface (not shown) may be implemented as a device like a button, a touch pad, a mouse, and a keyboard, or as a touch screen that can perform both of the aforementioned display function and a manipulation input function. Here, a button may be various types of buttons such as a mechanical button, a touch pad, a wheel, etc. formed in any areas such as the front surface part, the side surface part, the rear surface part, etc. of the exterior of the main body, the door, etc. of the home appliance 100.

The input/output interface (not shown) may be an interface of any one of a high definition multimedia interface (HDMI), a mobile high-definition link (MHL), a universal serial bus (USB), a display port (DP), a Thunderbolt, a video graphics array (VGA) port, an RGB port, a D-subminiature (D-SUB), or a digital visual interface (DVI). Meanwhile, although explanation has been made by assuming the home appliance 100 as a refrigerator, it is obvious that the home appliance 100 can be implemented as a display device, and the display device can be implemented to be connected with a refrigerator through an input/output interface provided on the display device, and to be attached to or detached from an area of the refrigerator.

Meanwhile, the home appliance 100 may receive a user voice signal from an external device including a microphone. In this case, the received user voice signal may be a digital voice signal, but it may also be an analog voice signal depending on embodiments. As an example, the home appliance 100 may receive a user voice signal through a wireless communication method such as Bluetooth and Wi-Fi. Here, an external device may be implemented as a remote control device or a smartphone.

The home appliance 100 may transmit the voice signal to an external server, for voice recognition of the voice signal received from an external device.

In this case, a communication module for communication with an external device and an external server may be implemented as one module, or implemented as separate modules. For example, the communication module may communicate with an external device by using a Bluetooth module, and communicate with an external server by using an Ethernet modem or a Wi-Fi module.

Meanwhile, the home appliance 100 may additionally include a tuner and a demodulation part depending on embodiments.

The tuner (not shown) may tune a channel selected by a user in radio frequency (RF) signals received through an antenna or all prestored channels, and receive RF broadcast signals.

The demodulation part (not shown) may receive a digital IF (DIF) signal converted at the tuner and demodulate the signal, and perform channel demodulation, etc.

FIG. 12 is a flow chart for illustrating a controlling method of a home appliance according to an embodiment of the disclosure.

In a controlling method of a home appliance according to an embodiment of the disclosure, a board screen is provided on a display provided on the front surface of the home appliance in operation S1210.

Then, if an image is received, a display size of the image is identified on the basis of resolution information of the image in operation S1220.

Then, the image is added onto the board screen on the basis of the identified display size in operation S1230. Then, if a first touch input with respect to the image is detected, at least one of the display location or the display size of the image is adjusted to correspond to the first touch input in operation S1240.

If a second touch input with respect to the board screen is detected, a drawing object corresponding to the second touch input is added onto the board screen in operation S1250.

Then, information on the image and information on the drawing object added to the board screen is stored in operation S1260.

Here, the information on the image includes at least one of a file path of the image, a file type of the image, coordinate information of the image added onto the board screen, or size information of the image, and the information on the drawing object includes at least one of shape information of the drawing object or coordinate information of the drawing added onto the board screen.

The controlling method according to an embodiment of the disclosure may include the steps of, according to an event wherein a predetermined cycle comes or an event wherein a storage menu is selected, capturing the board screen and acquiring a capture image of the board screen, and transmitting the capture image, the information on the image, and the information on the drawing object to a server.

The controlling method according to an embodiment of the disclosure may include the step of, based on receiving a command for providing a new board screen, storing information on the board screen provided on the display, and then providing the new board screen through the display. Here, the information on the board screen may include at least one of the capture image with respect to the board screen, the information on the image, or the information on the drawing object.

The controlling method according to an embodiment of the disclosure may include the step of, based on the number of board screens stored in the home appliance exceeding a threshold number, transmitting the information on the board screen stored in the home appliance to the server.

The controlling method according to an embodiment of the disclosure may include the steps of providing an icon for executing any one of a plurality of applications onto the board screen, and based on a user command selecting the icon being input, displaying an execution screen of an application corresponding to the selected icon in one area on the board screen.

Also, the home appliance may store user identification information and user device information corresponding to a plurality of respective users, and the controlling method according to an embodiment of the disclosure may include the steps of recognizing a text corresponding to the drawing object, identifying at least one user among the plurality of users on the basis of the text and the stored user identification information, and transmitting information related to the drawing object on the basis of the user device information corresponding to the identified user.

The controlling method may include the steps of recognizing a text corresponding to the drawing object, and changing the drawing object to a text object of a predetermined font on the basis of the recognized text.

In addition, the controlling method may include the step of, based on receiving a command for loading information on a board screen stored in the home appliance, displaying a capture image corresponding to the stored board screen, and a list including information on the time point of generation and the time point of storage of the stored board screen.

The controlling method according to an embodiment of the disclosure may include the step of, based on detecting a user through the sensor provided in the home appliance in a standby mode wherein the display is turned off, displaying the board screen before the display was turned off on the basis of the information on the stored board screen.

Meanwhile, the methods according to the aforementioned various embodiments of the disclosure may be implemented in forms of applications that can be installed on conventional electronic devices.

Also, the methods according to the aforementioned various embodiments of the disclosure may be implemented just by software upgrade, or hardware upgrade of conventional electronic devices.

In addition, the aforementioned various embodiments of the disclosure may be performed through an embedded server provided on an electronic device, or an external server of at least one of an electronic device or a display device.

Meanwhile, according to an embodiment of the disclosure, the aforementioned various embodiments may be implemented as software including instructions stored in machine-readable storage media, which can be read by machines (e.g.: computers). The machines refer to devices that call instructions stored in a storage medium, and can operate according to the called instructions, and the devices may include an electronic device according to the aforementioned embodiments (e.g.: an electronic device A). In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

Also, according to an embodiment of the disclosure, the methods according to the aforementioned various embodiments of the disclosure may be provided while being included in a computer program product. The computer program product can be traded between a seller and a purchaser as a commodity. The computer program product may be distributed in the form of a machine-readable storage medium (e.g.: a compact disc read only memory (CD-ROM)), or distributed online through an application store (e.g.: PLAYSTORE™). In the case of online distribution, at least a portion of the computer program product may be at least temporarily stored in a storage medium such as a server of a manufacturer, a server of an application store, or a memory of a relay server, or temporarily generated.

In addition, each of the components (e.g.: a module or a program) according to the aforementioned various embodiments may be comprised of a single entity or a plurality of entities, and some sub-components among the aforementioned sub-components may be omitted, or different sub-components may be further included in the various embodiments. Alternatively or additionally, some components (e.g.: modules or programs) may be integrated into one entity to perform the same or similar functions performed by each component prior to integration. Operations performed by a module, a program, or another component, in accordance with the various embodiments, may be performed sequentially, in parallel, repetitively, or in a heuristic manner, or at least some operations may be performed in a different order, omitted, or a different operation may be added.

Further, while preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. A home appliance comprising:
   a display provided on a front surface of the home appliance;
   a storage;
   a communication interface including a circuit; and
   a processor configured to:
      provide a board screen on the display,
      based on receiving an image through the communication interface, identify a display size of the image based on resolution information of the image, and add the image onto the board screen based on the identified display size,
      based on detecting a first touch input with respect to the image, adjust at least one of a display location or a display size of the image to correspond to the first touch input, and
      based on detecting a second touch input with respect to the board screen, add a drawing object corresponding to the second touch input onto the board screen,
   wherein the processor stores information on the image and information on the drawing object added to the board screen in the storage,
   wherein the storage stores user identification information and user device information corresponding to a plurality of respective users, and
   wherein the processor is further configured to:
      recognize a text corresponding to the drawing object,
      identify at least one user among the plurality of users based on the text and the stored user identification information, and
      transmit information related to the drawing object through the communication interface based on the user device information corresponding to the identified at least one user.

2. The home appliance of claim 1,
   wherein the information on the image comprises:
      at least one of a file path of the image, a file type of the image, coordinate information of the image added onto the board screen, or size information of the image, and
   wherein the information on the drawing object comprises:
      at least one of shape information of the drawing object or coordinate information of a drawing added onto the board screen.

3. The home appliance of claim 1, wherein the processor is further configured to:
   according to an event wherein a predetermined cycle comes or an event wherein a storage menu is selected, capture the board screen and acquire a capture image of the board screen, and
   control the communication interface to transmit the capture image, the information on the image, and the information on the drawing object to a server.

4. The home appliance of claim 1,
   wherein the processor is further configured to:
      based on receiving a command for providing a new board screen, store information on the board screen provided on the display in the storage, and then provide the new board screen through the display, and
   wherein the information on the board screen comprises:
      at least one of a capture image with respect to the board screen, the information on the image, or the information on the drawing object.

5. The home appliance of claim 4, wherein the processor is further configured to:
   based on a number of board screens stored in the storage exceeding a threshold number, transmit the information on the board screen stored in the storage to a server through the communication interface.

6. The home appliance of claim 4, wherein the information on the board screen further comprises at least one of an identification number of the board screen, a time point of generation of the board screen, a time point of storage of the board screen, a time point of final update of the board screen, a capture image with respect to the board screen, or information on an object added to the board screen.

7. The home appliance of claim 1, wherein the processor is further configured to:
   provide an icon for executing any one of a plurality of applications included in the storage onto the board screen, and
   based on a user command of selecting the icon being input, control the display to display an execution screen of an application corresponding to the selected icon in one area on the board screen.

8. The home appliance of claim 1, wherein the processor is further configured to:
   recognize a text corresponding to the drawing object, and
   change the drawing object to a text object of a predetermined font based on the recognized text.

9. The home appliance of claim 1, comprising:
   a sensor,
   wherein the processor is further configured to:
      based on detecting a user through the sensor in a standby mode wherein the display is turned off, control the display to display a stored board screen which was displayed before the display was turned off based on information on the stored board screen.

10. The home appliance of claim 1, wherein the board screen is configured to display still images, moving images, memos, drawings, or applications, without restrictions on formats or locations thereof.

11. The home appliance of claim 1, wherein the identified display size is based on the resolution information such that a display size of a higher resolution image is larger than a display size of a lower resolution image.

12. The home appliance of claim 1,
wherein the first touch input comprises at least one of a pinch in, a pinch out, a drag, or a rotation, and
wherein the second touch input comprises at least one of a drag, a pan, a swipe, or a flick.

13. A home appliance comprising:
a display provided on a front surface of the home appliance;
a storage;
a communication interface including a circuit; and
a processor configured to:
provide a board screen on the display,
based on receiving an image through the communication interface, identify a display size of the image based on resolution information of the image, and add the image onto the board screen based on the identified display size,
based on detecting a first touch input with respect to the image, adjust at least one of a display location or a display size of the image to correspond to the first touch input, and
based on detecting a second touch input with respect to the board screen, add a drawing object corresponding to the second touch input onto the board screen,
wherein the processor stores information on the image and information on the drawing object added to the board screen in the storage, and
wherein the processor is further configured to:
based on receiving a command for loading information on a board screen stored in the storage, control the display to display a capture image corresponding to the stored board screen, and a list including information on a time point of generation and a time point of storage of the stored board screen.

14. A controlling method for a home appliance, the method comprising:
providing a board screen on a display provided on a front surface of the home appliance;
based on receiving an image, identifying a display size of the image based on resolution information of the image;
adding the image onto the board screen based on the identified display size;
based on detecting a first touch input with respect to the image, adjusting at least one of a display location or a display size of the image to correspond to the first touch input;
based on detecting a second touch input with respect to the board screen, adding a drawing object corresponding to the second touch input onto the board screen;
storing information on the image and information on the drawing object added to the board screen;
storing user identification information and user device information corresponding to a plurality of respective users;
recognizing a text corresponding to the drawing object;
identifying at least one user among the plurality of users based on the text and the stored user identification information; and
transmitting information related to the drawing object through a communication interface based on the user device information corresponding to the identified at least one user.

15. The method of claim 14,
wherein the information on the image comprises:
at least one of a file path of the image, a file type of the image, coordinate information of the image added onto the board screen, or size information of the image, and
wherein the information on the drawing object comprises:
at least one of shape information of the drawing object or coordinate information of a drawing added onto the board screen.

16. The method of claim 14, further comprising:
according to an event wherein a predetermined cycle comes or an event wherein a storage menu is selected, capturing the board screen and acquiring a capture image of the board screen; and
transmitting the capture image, the information on the image, and the information on the drawing object to a server.

17. The method of claim 14, further comprising:
based on receiving a command for providing a new board screen, storing information on the board screen provided on the display, and then providing the new board screen through the display,
wherein the information on the board screen comprises:
at least one of a capture image with respect to the board screen, the information on the image, or the information on the drawing object.

18. The method of claim 17, further comprising:
based on a number of board screens stored in the home appliance exceeding a threshold number, transmitting the information on the board screen stored in the home appliance to a server.

* * * * *